US008606758B2

(12) United States Patent
Herbst

(10) Patent No.: US 8,606,758 B2
(45) Date of Patent: Dec. 10, 2013

(54) ARCHIVING-SAFE REPLICATION OF RELATIONAL DATA

(75) Inventor: Axel Herbst, Eppingen-Rohrbach (DE)

(73) Assignee: SAP AG, Walldorf (DE)

( * ) Notice: Subject to any disclaimer, the term of this patent is extended or adjusted under 35 U.S.C. 154(b) by 91 days.

(21) Appl. No.: 13/240,816

(22) Filed: Sep. 22, 2011

(65) Prior Publication Data

US 2013/0080383 A1     Mar. 28, 2013

(51) Int. Cl.
*G06F 7/00*     (2006.01)
*G06F 17/00*     (2006.01)

(52) U.S. Cl.
USPC ............. 707/667; 707/60; 707/607; 707/661; 707/665

(58) Field of Classification Search
USPC .................................. 707/600, 607, 661, 667
See application file for complete search history.

(56) References Cited

U.S. PATENT DOCUMENTS

| 8,315,999 | B2 * | 11/2012 | Chatley et al. | ............... 707/705 |
| 2005/0149584 | A1 * | 7/2005 | Bourbonnais et al. | ........ 707/204 |
| 2009/0254575 | A1 * | 10/2009 | Kravets | ......................... 707/101 |

OTHER PUBLICATIONS

"Sustainability Report." SAP Library, SAP AG, 2005. 2 pages.
"BW Extractors for Inventory Management." SAP Library, SAP AG, 2005. 2 pages.
"Archive Development Kit." SAP Library, SAP AG, 2005. 1 page.
"Archive Administration." SAP Library, SAP AG, 2005. 1 page. SAP Library.
"Archive" [online]. WebArchive.org, Wikipedia, 2010 [retrieved on Sep. 22, 2011]. Retrieved from the Internet: <URL:http://web.archive.org/web/20100726031147/http:/en.wikipedia.org/wiki/Archiving>.
"Analytics" [online]. WebArchive.org, Wikipedia, 2010 [retrieved on Sep. 22, 2011]. Retrieved from the Internet: <URL:http://web.archive.org/20101217221755/http:/en.wikipedia.org/wiki/Analytics.

* cited by examiner

*Primary Examiner* — Apu Mofiz
*Assistant Examiner* — Jared Bibbee
(74) *Attorney, Agent, or Firm* — Fish & Richardson P.C.

(57) ABSTRACT

A computer-implemented method for archiving information includes: executing a first application in a first process; determining that the first application is an archiving application configured to archive information stored in a transactional system; assigning, based on the determination, an archiving mode to the first process; receiving, from the first process and after assigning the archiving mode, a request to delete information; and processing the request to delete information according to the archiving mode.

13 Claims, 6 Drawing Sheets

ARCHIVING-SAFE REPLICATION OF RELATIONAL DATA

TECHNICAL FIELD

This document relates to databases.

BACKGROUND

A transactional system, such as an ERP (Enterprise Resource Planning) system, can use a relational or other type of database. Such a system can be referred to as an OLTP (On-Line Transactional Processing) system. An OLTP system can be used to store and manage data produced from everyday business tasks of an organization. Occasionally, such as on a periodic basis, data stored in an OLTP system can be archived to an archiving system. An OLAP (On-Line Analytical Processing) system can be used to analyze data received from one or more OLTP systems. An OLAP system can be used for activities such as planning, problem solving, and decision support. Data in an OLAP system can be denormalized, in contrast to data in an OLTP system, which can be highly normalized.

SUMMARY

In a first aspect, a computer-implemented method for archiving information includes: executing a first application in a first process; determining that the first application is an archiving application configured to archive information stored in a transactional system; assigning, based on the determination, an archiving mode to the first process; receiving, from the first process and after assigning the archiving mode, a request to delete information; and processing the request to delete information according to the archiving mode.

The method can be implemented using a computer program product tangibly embodied in a computer readable storage device, the computer program product including instructions that when executed by a processor perform the method.

Implementations can include any or all of the following features. Determining that the first application is an archiving application comprises detecting a call to open an archive. Determining that the first application is an archiving application comprises detecting a particular database connection.

The transactional system is configured to perform an archiving process before a replication process and processing the request to delete information includes: converting the request to delete information to a new request comprising a copy request for the information and a delete request for the information; creating an information copy from the information according to the copy request; and deleting the information according to the delete request. The information is deleted from the transactional system and the information copy is provided to an analysis system. The information copy is provided to the transactional system and a replication system subsequently provides the information copy to the analysis system. The method further includes using, by an analysis application, the information copy provided to the analysis system. The new request includes a delete-into request which includes, in one database command, the copy request and the delete request. The method further includes: executing a second application in a second process, the second process having a non-archiving mode assigned; receiving, from the second process, before completion of the first process and after the determination, another request to delete other information; and performing the other request to delete the other information without converting the other request into separate copy and delete requests.

The transactional system is configured to perform the archiving process after the replication process and processing the request to delete information includes deleting information from the transactional system and not deleting information from an analysis system. The method further includes: executing a second application in a second process, the second process having a non-archiving mode assigned; receiving, from the second process, before completion of the first process and after the determination, another request to delete other information; and performing the other request to delete the other information including 1) identifying information in the analysis system that corresponds to the other information; 2) deleting the identified information from the analysis system; and 3) deleting the other information from the transactional system.

In a second aspect, a computer-implemented method for archiving information includes: executing a first application in a first process of a computer system; executing a second application in a second process of the computer system; determining that the first application is an archiving application configured to archive information stored in a transactional component of the computer system; assigning, based on the determination that the first application is an archiving application, an archiving mode to the first process; determining that the second application is not an archiving application; assigning, based on the determination that the second application is not an archiving application, a non-archiving mode to the second process; receiving, from the first process, a first request to delete first information; receiving, from the second process, a second request to delete second information; determining whether the computer system is configured to perform an archiving process before a replication process; in response to determining that the computer system is configured to perform the archiving process before the replication process: processing the first request to delete the first information including 1) converting the request to delete the first information to a new request comprising a copy request for the first information and a delete request for the first information; 2) creating an information copy from the first information according to the copy request; and 3) deleting the first information according to the delete request; and processing the second request to delete the second information including deleting the second information from the transactional component; in response to determining that the computer system is configured to perform the archiving process after the replication process: processing the first request to delete the first information including deleting the first information from the transactional component without deleting corresponding information from an analysis system; and processing the second request to delete the second information including 1) identifying information in the analysis system that corresponds to the second information; 2) deleting the identified information from the analysis system; and 3) deleting the second information from the transactional component.

Implementations can include any or all of the following features. Determining that the first application is an archiving application includes detecting a call to open an archive. Determining that the first application is an archiving application includes detecting a particular database connection.

In a third aspect, a system includes: at least one processor; and a computer program product tangibly embodied in a computer readable storage device and comprising instructions that when executed by the processor cause the system to perform a method comprising: executing a first application in a first process; determining that the first application is an archiving application configured to archive information stored in a transactional system; assigning, based on the determination, an archiving mode to the first process; receiving, from the first process and after assigning the archiving mode, a request to delete information; and processing the request to delete information according to the archiving mode.

Implementations can include any or all of the following features. The transactional system is configured to perform an archiving process before a replication process and processing the request to delete information includes: converting the request to delete information to a new request comprising a copy request for the information and a delete request for the information; creating an information copy from the information according to the copy request; and deleting the information according to the delete request. The method further includes: executing a second application in a second process, the second process having a non-archiving mode assigned; receiving, from the second process, before completion of the first process and after the determination, another request to delete other information; and performing the other request to delete the other information without converting the other request to the new request.

Particular embodiments of the subject matter described in this specification can be implemented to realize one or more of the following advantages. Analysis applications can be enabled to analyze information that has been archived from a transactional database. Analysis applications can access information that has been archived from the transactional database, even if a replication system used to copy information from the transactional database to the analysis system does not have access to the archived information. A request to delete information can be converted to a new request without modifying the source code of the archiving application that includes the request to delete information.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
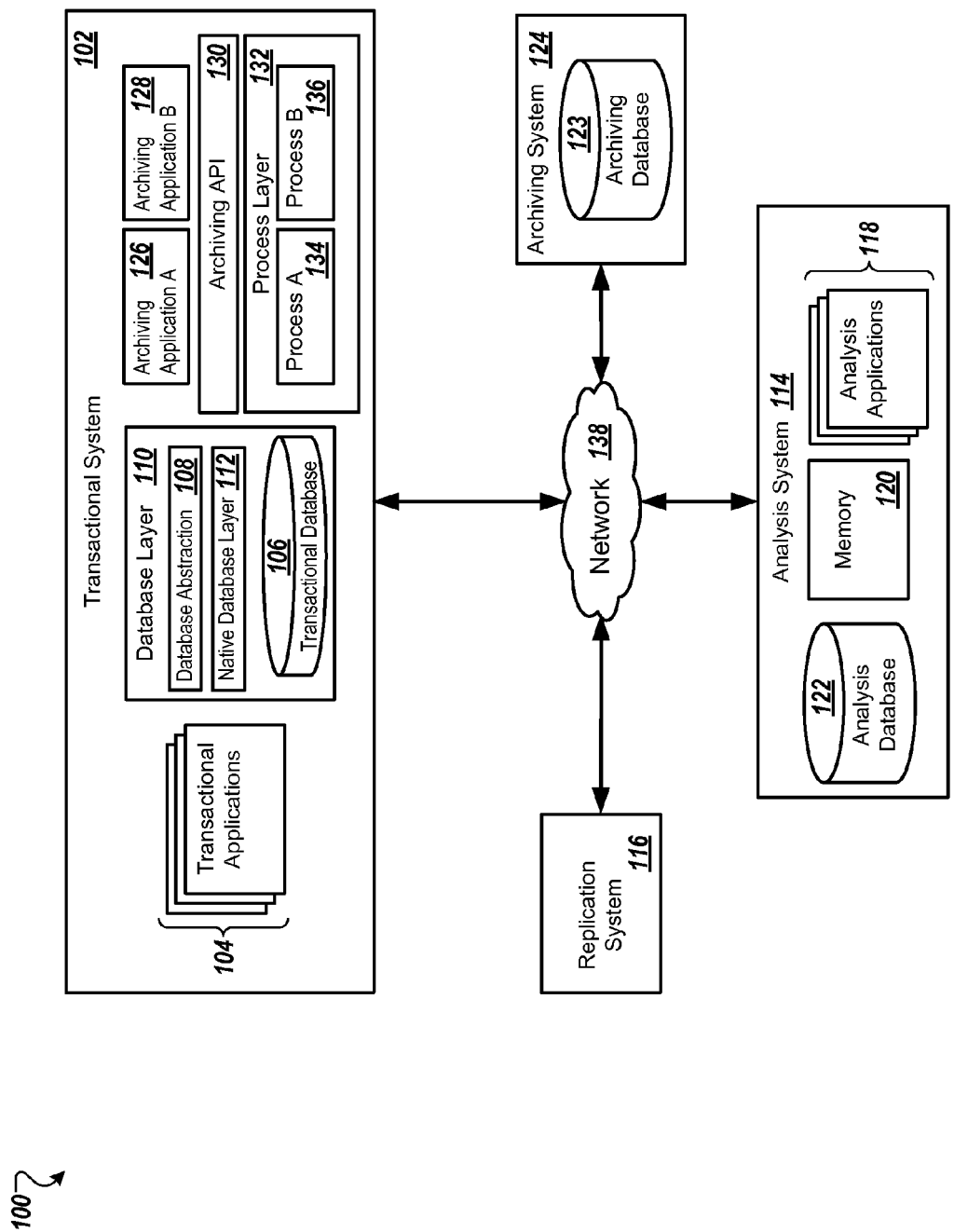
FIG. 1 is a block diagram of a system for archiving information.

FIG. 1 is a block diagram of a system 100 for archiving information. An organization can use a transactional system 102 for transactions related to one or more functions of the organization. For example, one or more transactional applications 104 can, based on the company's activities, add transactional information to a transactional database 106, and can edit or delete transactional information included in the transactional database 106. The transactional database 106 can be, for example, a relational database. Different types of transactional databases 106 (e.g., from different vendors) can be used. Below are described examples showing that information about to be archived can also be preserved so that an analytical process can take the information into account.

The transactional application(s) 104 can submit database commands to a database abstraction layer 108 included in a database layer 110 of the transactional system 102. The database abstraction layer 108 can provide an abstract interface to the transactional database 106. That is, the transactional applications 104 can issue commands in a database-neutral format to the database abstraction layer 108 according to the abstract interface. The database abstraction layer 108 can convert the database-neutral commands into native database commands that are compatible with the type of the transactional database 106 that is currently configured for the transactional system 102. A native database layer 112 can perform the native database commands on the transactional database 106.

The organization can use an analysis system 114 to analyze information received from one or more sources, for example the transactional system 102. The analytical processing can be performed in the analysis system 114, rather than in the transactional system 102, for example, to offload analysis processing from the transactional system 102 or other system resources. A replication system 116 can be used to copy information from the transactional database 106 to the analysis system 114, for example. The analysis system 114 can include one or more analysis applications 118, which can, for example, analyze information stored in memory 120 or in an analysis database 122. The analysis database 122 can, for example, be used for logging transactions performed against the data in the memory 120, to store one or more backups of the memory 120, and/or to restore information to the memory 120.

The organization using the system 100 can, at one or more times such as periodically, archive information from the transactional database 106 to an archiving database 123 included in an archiving system 124. For example, archiving applications 126 and 128 can each be designed and adapted to archive information from one or more of the transactional applications 104 and/or from one or more particular business objects. The archiving applications 126 and 128 can use an archiving API (Application Programming Interface) 130 to perform operations, for example an archiving write phase and an archiving delete phase. The archiving write phase can include copying information from the transactional database 106 to the archiving database 123. The archiving delete phase can include deleting information written to the archiving database 123 from the transactional database 106. In some implementations, more or fewer archiving applications can be used.

The transactional applications 104 can access information from the archiving database 123 as well as from the transactional database 106. That is, the information in the archiving database 123 is logically present to the transactional applications 104 (although accessing the information from the archiving database 123 may take more time as compared to accessing information from the transactional database 106). In contrast, information in the archiving database 123 may not be logically present to or accessible from the replication system 116.

For example, the replication system 116 can be configured to use a table-based replication approach to copy data from the transactional database 106 to the analysis system 114. In such a configuration, the replication system 116 can access information from tables included in the transactional database 106 but not information included in the archiving database 123. Therefore, the replication system 116 might not copy, to the analysis system 116, information archived to the archiving database 123. As a result, analysis performed using the analysis applications 118 may be incomplete or inaccurate.

In some implementations, the transactional system 102 is configured to perform replication before archiving. In some implementations, on the other hand, the transactional system 102 is configured to perform archiving before replication. For implementations where archiving is performed before replication, the source code of the archiving applications 126 and 128 can be designed or modified to convert each request to delete information that occurs during an archiving delete phase to one or more new requests, for example a copy request and a delete request. During execution of the copy request, data to be deleted from the transactional database 106 can be copied to the analysis system 114 or, as another example, can be copied to a location that is accessible to the replication system 116, so that the replication system 116 can copy the information to the analysis system 114 when executing a replication process. During execution of the delete request, information can be deleted from the transactional database 106.

However, several problems can occur with an approach of modifying source code of the archiving applications 126 and 128. For example, source code may not be available for every archiving application. As another example, requests to delete information may not be visible in the source code of the archiving application 126 or 128, such as if a request to delete information is included somewhere other than the top of a function call stack. As yet another example, it may be costly to modify the source code of every archiving application, as many archiving applications can exist and be used even within a single organization.

Another approach can be used to copy data to be archived to the archiving system 124 to the analysis system 114, for implementations where the transactional system 102 is configured to perform archiving before replication. For example, rather than modify source code of the archiving applications 126 and 128, a process layer 132 can be used to determine that the archiving application 126 or 128 is an archiving application, rather than a transactional application 104 or some other type of application. The process layer 132 can assign an archiving mode to the archiving application 126 or 128 based on determining that the archiving application 126 or 128 is an archiving application. The process layer 132 can determine that the archiving application 128 or 128 is an archiving application, for example, by detecting, from a process executing the archiving application 126 or 128 (e.g., a process 134 or 136, respectively), a call to an interface defined in the archiving API 130 to open an archive for deletion. For a process (e.g., the process 134 or the process 136) that is in the archiving mode, the process layer 132 can convert each request to delete information received from the process to a new request that includes a copy request for the information (e.g., to copy information to the analysis system 114, or to copy information to a location that is accessible to the replication system 116) and a delete request for the information (e.g., to delete information from the transactional database 106). By contrast, when a non-archiving application sends a request to delete information, such a non-archive request may not be converted, based on the archiving mode not having been assigned, or such a request may instead be converted in a different way, to name just two examples. In some implementations, one or more modes other than archiving and non-archiving can exist, and processing of requests to delete information may be performed based on the one or more such modes.

Each of the processes 134 and 136 can be bound to a particular archiving application (e.g., the archiving application 126 or 128, respectively). Accordingly, the archiving mode can be assigned to the process 134 or 136 for the duration of the process 134 or 136. For processes not in the archiving mode, the process layer 132 can be configured to not convert requests to delete information. For example, a process can be associated with the transactional application 104, and the transactional application 104 can include a request to delete information, where the context of the request to delete information is not archiving, but is a transactional context in which deletions should result in permanent deletion of data from the transactional database 106 without archiving to the archiving database 124. For such a process not in the archiving mode, the process layer 132 does not copy information to the analysis system 114 based on the request to delete information.

As mentioned above, in some implementations, the transactional system 102 is configured to perform replication before archiving. In such implementations, the replication system 116 can be configured to replicate transactional data from the transactional database 106 to the analysis database 122, such as in response to transactional data being added to the transactional database 106 by the transactional applications 104. The process layer 132 (or another component) can be configured to delete information from the transactional database 106 and to also identify corresponding information in the analysis database 122 and to delete the identified information from the analysis database 122, upon receiving a request to delete information from a process associated with the transactional application 104. That is, in response to a request to permanently delete information from the transactional system 102, corresponding transactional information that had been previously replicated to the analysis system 114 can be identified and deleted from the analysis system 114.

The process layer 132 may also be configured to delete information from the transactional system 102 but to not delete (e.g., to inhibit a deletion of) corresponding information from the analysis system 114 when a request to delete information in the context of archiving is received. For example, upon receiving a request to delete information from the process 134 or the process 136 that is associated with the archiving application 126 or the archiving application 128, respectively, the process layer 132 can delete the information from the transactional database 106 without deleting corresponding information from the analysis database 122. Corresponding information is not deleted from the analysis database 122, since the request to delete information in the context of archiving is not a request to permanently delete information but rather can be a request to delete information from the transactional database 106 that has been written (e.g., in an archive write operation) to the archiving database 123.

Each of the transactional system 102, the analysis system 114, the replication system 116, and the archiving system 124 can communicate with one or more of the others, for example, over a network 138. The network 138 can be, for example, the Internet or some other public or private, wired or wireless network. In some implementations, the archiving system 124 can be installed on the same physical machine(s) as, or be included within, the transactional system 102, to name just a few examples. Similarly, although the replication system 116 is shown as communicating with the transactional system 102 over the network 138, in some implementations, the archiving system 124 can be co-installed with or included in the transactional system 102.

Figure 2:
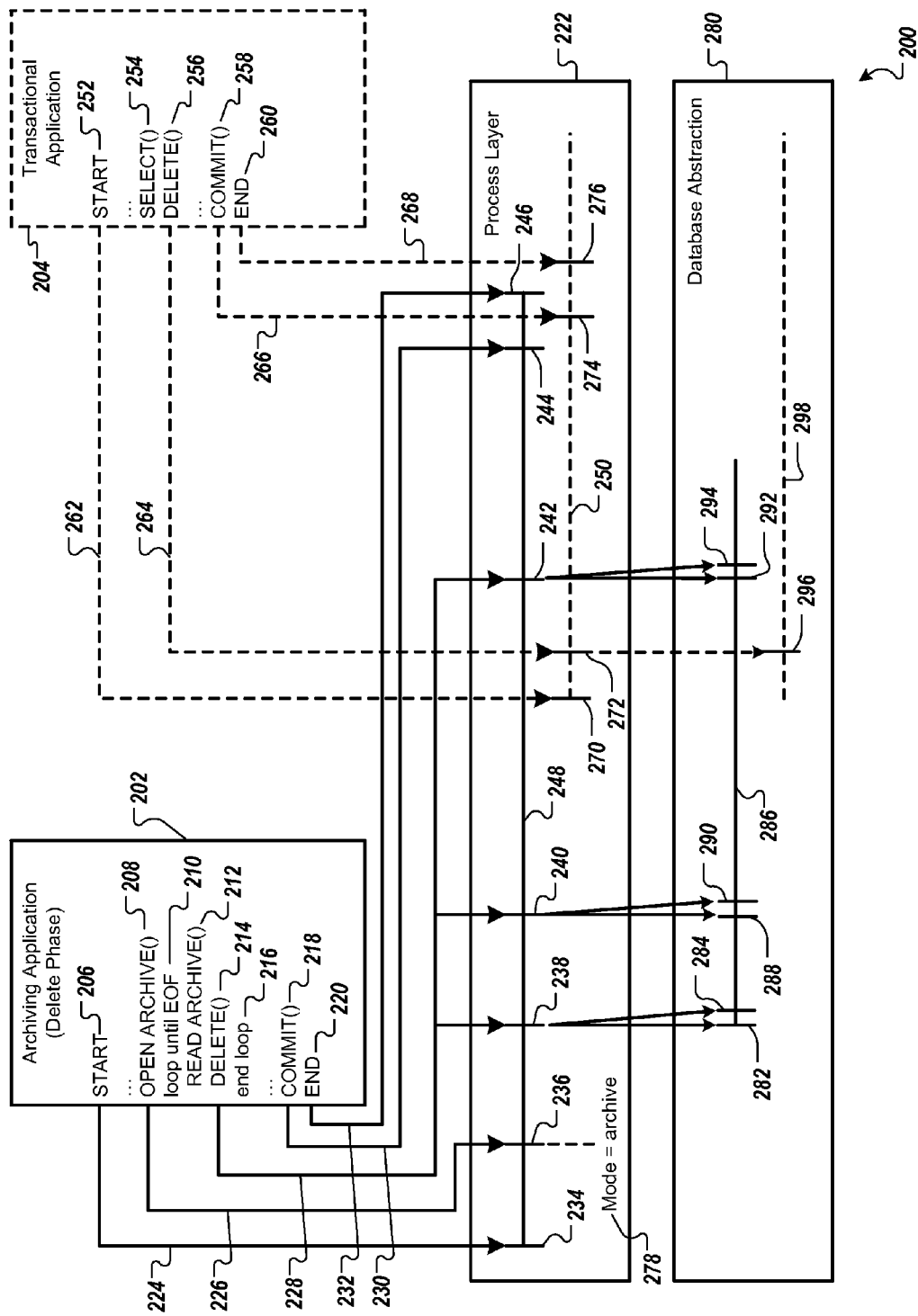
FIGS. 2 and 3 are block diagrams of systems for executing an archiving application and a transactional application.

FIG. 2 is a block diagram of a system 200 for executing at least one archiving application 202 and at least one transactional application 204. Each of the applications 202 and 204 includes executable instructions corresponding to one or more commands. That is, the command(s) can be generated as a result of running the application. The system 200 illustrates execution of the applications 202 and 204 when the system 200 is configured to perform an archiving process before a replication process. The archiving application 202 in this example includes commands 206-220 that are associated with a delete phase. The command 206 signals a start of processing of the delete phase. The command 208 is a command to open an archive (e.g., to open an archive associated with the archiving system 124). The commands 210 and 216 mark the beginning and end, respectively, of an iteration construct. The commands 212 and 214, which are a read command for reading information from the opened archive and a delete command for deleting corresponding information from a transactional database (e.g., the transactional database 106), respectively, are repeated until the end of the opened archive is reached. Deletions performed by one or more executions of the delete command 214 are committed by executing the command 218. The command 220 ends the delete phase of the archiving application 202.

The commands 206-220 can be executed by a process running in a process layer 222. For illustration, the present example shows arrows 224-232 that visually associate the commands 206, 208, 214, 218, and 220 to corresponding time points 234-246 on a timeline 248. The timeline 248 represents performance of the process associated with the archiving application 202 in the process layer 222. The time points 238, 240, and 242 correspond to three separate executions of the delete command 214 which result from three respective iterations of the iteration construct.

A timeline 250 represents performance of a process associated with the transactional application 204 in the process layer 222. For purposes of illustration, the transactional application 204 is here an application that is not considered an archiving application, in contrast to, say, the archiving application 202. The transactional application 204 includes commands 252-260. The command 252 signals a start of processing of the transactional application 204. The command 254 selects information from a transactional database (e.g., the transactional database 106). The command 256 is a delete command which deletes information from the transactional database. The command 258 commits database changes made by the transactional application 204. The command 260 ends the transactional application 204. Arrows 262-268 here visually associate the commands 252, 256, 258, and 260 with corresponding time points 270-276 on the timeline 250.

As discussed above, the process layer 222 can convert, for processes in an archiving mode, each request to delete information into a copy request and a delete request, where the copy request copies information to be deleted from the transactional database to an analysis system. For example, as indicated by an indicator 278, the process layer 222 can assign an archiving mode to the process executing the archiving application 202 based on detecting that the process is requesting to execute the command 208 to open an archive. The command 208 can, for example, be a command that is only included in archiving applications and can therefore be an indication that an application is an archiving application.

The process layer 222, for a process in the archiving mode, can convert each request to delete information associated with the process, for the duration of the process. Conversion of a request to delete information can prevent the request from being submitted to a database abstraction layer 280. Rather, in place of the request to delete information, a copy request and a delete request can be submitted to the database abstraction layer 280. For example, for the execution of the delete command 214, which is associated with the archiving application 202 and with the time point 238, the process layer 222 can convert the delete command 214 to a copy command and a delete command, represented by time points 282 and 284 on a timeline 286. The timeline 286 represents execution of database commands by the database abstraction layer 280 for the process associated with the archiving application 202. Similarly, for the execution of the delete command 214 associated with the time point 240, the process layer 222 can submit a copy request and a delete request (represented by time points 288 and 290, respectively) to the database abstraction layer 280, and for the execution of the delete command 214 associated with the time point 242, the process layer 222 can submit a copy request and a delete request (represented by time points 292 and 294, respectively) to the database abstraction layer 280.

For a process that is not in archiving mode, the process layer 222 can submit requests to delete information unchanged to the database abstraction layer 280. For example, a time point 296 on a timeline 298 represents execution, in the database abstraction layer 280, of the delete command 256 associated with the transactional application 204, after the process layer 222 submits the delete command 256, unconverted, to the database abstraction layer 280. The timeline 298 represents execution of database commands for the process associated with the transactional application 204.

As shown, the timeline 250 partially overlaps with the timeline 248. The timelines 248 and 250 illustrate an example of the process layer 222 receiving multiple requests to delete information, from multiple processes, with some processes being in the archiving mode and some processes being in a non-archiving mode. The process layer 222 can convert one or more requests to delete information received from processes in the archiving mode and can perform one or more requests to delete information received from processes in the non-archiving mode, without converting such requests.

As shown, for example by time points 282 and 284, it can be the process layer 222 that converts a request to delete information into a copy request and a delete request and submits the copy request and the delete request to the database abstraction layer 280. As another example, the conversion of the request to delete information can be performed by the database abstraction layer 280. For example, the process layer can indicate to the database abstraction layer 280 that the request to delete information should be converted by including a particular database connection qualifier when providing the request to delete information to the database abstraction layer 280. As yet another example, the conversion of the request to delete information can be performed by a native database layer (e.g., the native database layer 112).

The request to delete information can be, in some implementations, of the form "DELETE FROM table WHERE condition". The request to delete information can be converted, in some implementations, to a copy request having the form "SELECT*FROM table INTO target WHERE condition" and to a delete request. In some implementations, the delete request can be of the same form as the request to delete information (e.g., "DELETE FROM table WHERE condition", with the delete request occurring after the copy request). In some implementations, the request to delete information can be converted into a delete-into request which has the form "DELETE FROM table WHERE condition INTO target", where target can be, for example, a table in a particular database, a file, a memory buffer, or some other destination. In some implementations, the delete-into request can be a SQL (Structured Query Language) extension.

Figure 3:
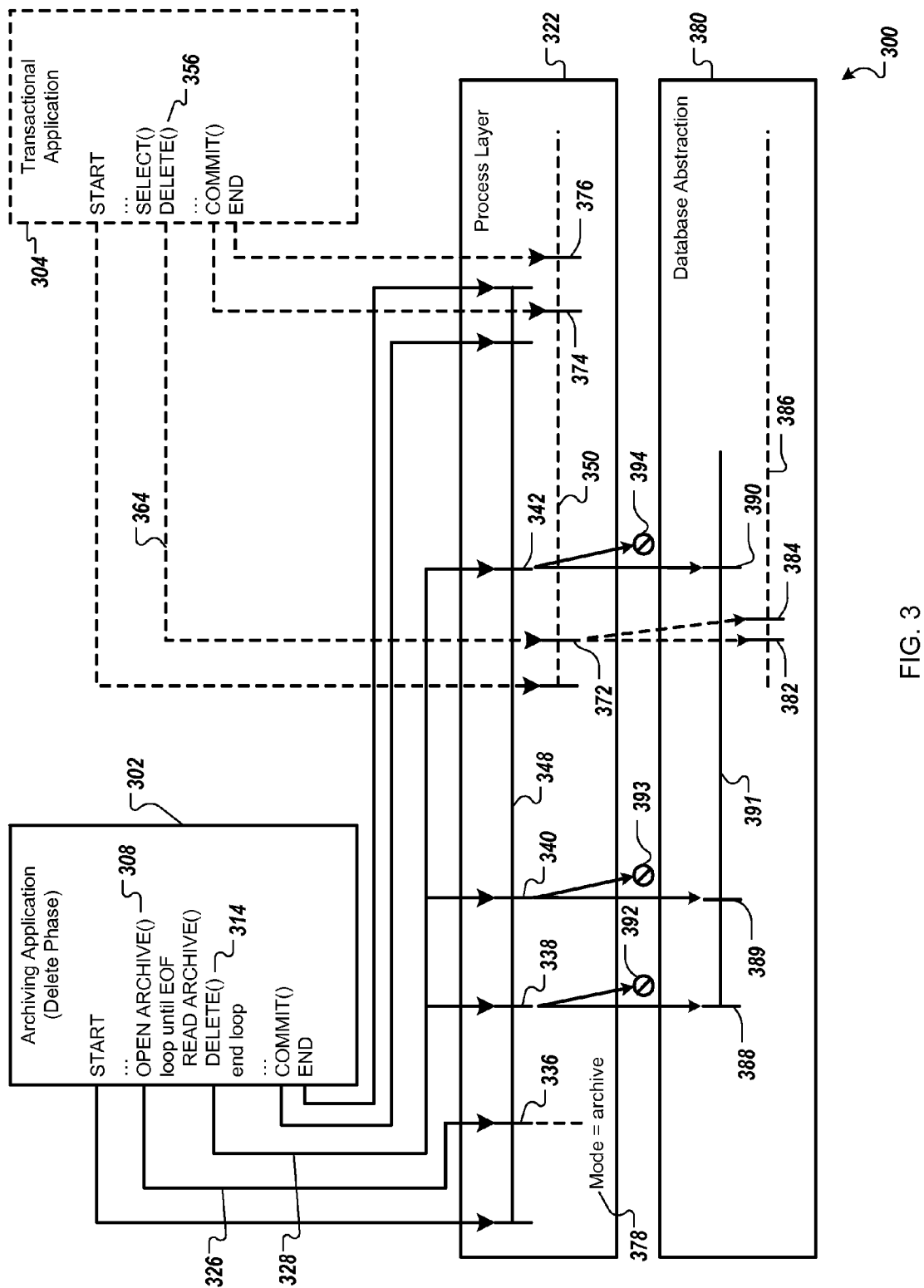

FIG. 3 is a block diagram of a system 300 for executing at least one archiving application 302 and at least one transactional application 304. Each of the applications 302 and 304 includes executable instructions corresponding to one or more commands. That is, the command(s) can be generated as a result of running the application. The system 300 illustrates execution of the applications 302 and 304 when the system 300 is configured to perform an archiving process after a replication process. The archiving application 302 in this example includes commands that are associated with a delete phase that corresponds to the commands 206-220 discussed above with respect to FIG. 2, including an open archive command 308 and a delete command 314.

The commands 308 and 314 can be executed by a process running in a process layer 322. For illustration, the present example shows arrows 326 and 328 that visually associate the commands 306 and 314 to corresponding time points 336, 338, 340 and 342 on a timeline 348. The timeline 348 represents performance of the process associated with the archiving application 302 in the process layer 322. The time points 338, 340, and 342 correspond to three separate executions of the delete command 314 which result from three respective iterations of an iteration construct.

A timeline 350 represents performance of a process associated with the transactional application 304 in the process layer 322. For purposes of illustration, the transactional application 304 is here an application that is not considered an archiving application, in contrast to, say, the archiving application 302. The transactional application 304 includes commands that correspond to the commands 252-260 discussed above with respect to FIG. 2, including a delete command 356 which deletes information from the transactional database. An arrow 364 here visually associates the command 356 with a corresponding time point 372 on the timeline 350.

As discussed above, the process layer 322 can be configured, when the system 300 is configured to perform an archiving process after a replication process, to delete information from a transactional database and to also identify corresponding information in an analysis database and to delete the identified information from the analysis database, upon receiving a request to delete information from a process that is associated with the transactional application 304 (e.g., a process that is not in the archiving mode). For example, in place of the request to delete information, a first delete request and a second delete request can be submitted to a database abstraction layer 380, where the first delete request is a request to delete information from the transactional system and the second delete request is a request to delete corresponding information from the analysis system. For example, for the execution of the delete command 356, the process layer 322 can convert the delete command 356 to a first delete command and a second delete command, represented by time points 382 and 384 on a timeline 386, respectively. The timeline 386 represents execution of database commands by the database abstraction layer 380 for the process associated with the transactional application 304.

For a process that is in the archiving mode, the process layer 322 can, for example, submit requests to delete information to the database abstraction layer 380 without converting the request to delete information to another request which includes deleting corresponding information from the analysis system. Or, as another example, the process layer 322 can inhibit or block a request to delete information from the analysis system. For example, time points 388, 389, and 390 on a timeline 391 can represent three executions, in the database abstraction layer 380, of the delete command 314 associated with the archiving application 302, after the process layer 322 submits the delete command 314, unconverted, to the database abstraction layer 380. The timeline 391 represents execution of database commands for the process associated with the archiving application 302. As another example, indicators 392, 393, and 394 can represent the process layer 322 blocking or inhibiting requests to delete information from the analysis system that correspond to the requests to delete information that are associated with the time points 338, 340, and 342, respectively (e.g., where the time points 338, 340, and 342 are associated with the delete command 314 that is requested by the process that is associated with the archiving application 302 and that is in the archiving mode).

Figure 4:
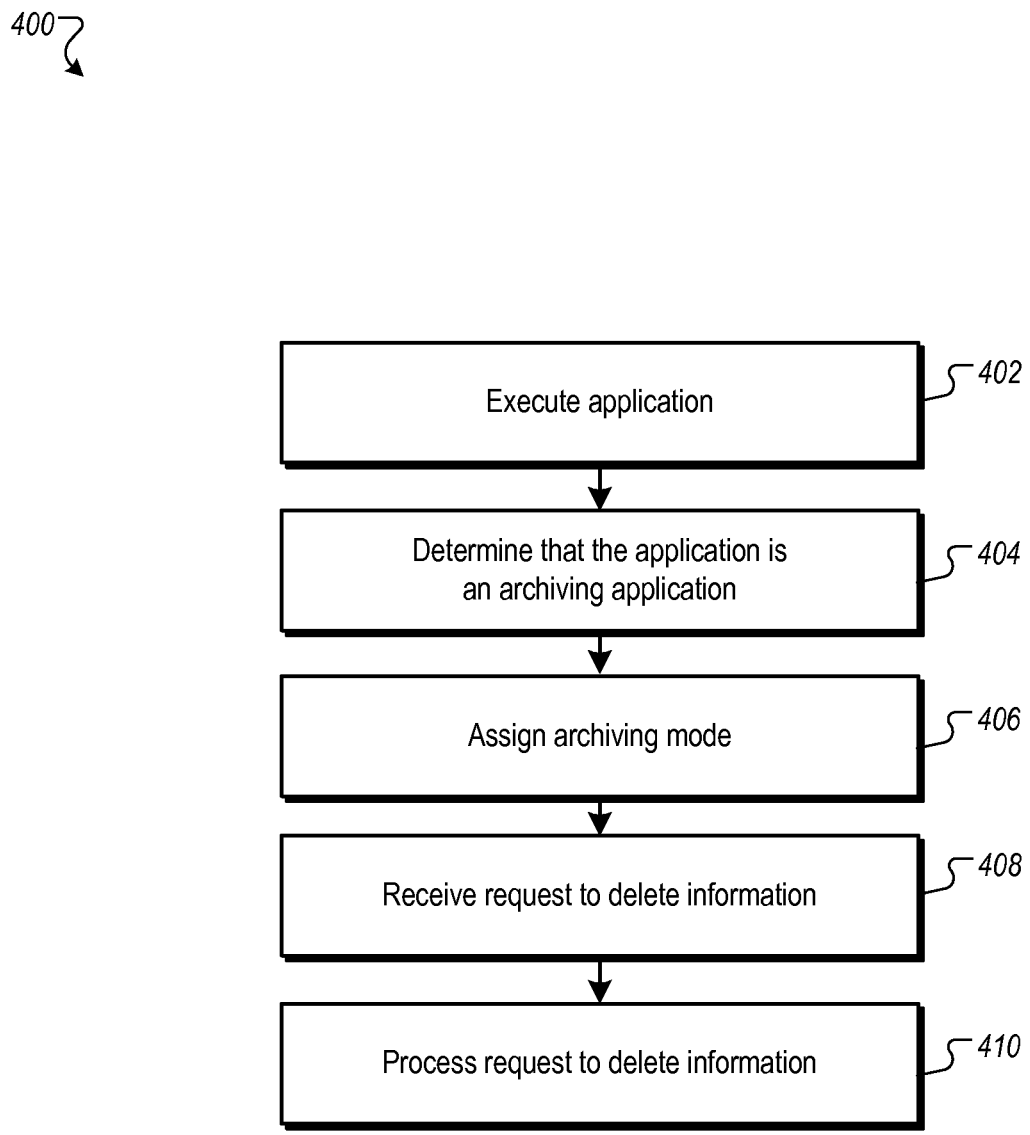
FIGS. 4 and 5 show flow charts of examples of methods that can be used for archiving information.

FIG. 4 shows a flow chart of an example of a method 400 that can be used for archiving information. The method 400 can be performed by a processor executing instructions in a computer program product. In step 402, a first application is executed in a first process. For example, with respect to FIG. 1, the archiving application 126 can be executed by the process 134, in the process layer 132.

In step 404, it is determined that the first application is an archiving application configured to archive information stored in a transactional system. Determining that the first application is an archiving application can include, for example, detecting a call to open an archive. For example, with respect to FIG. 1, the process layer 132 can determine that the process 134 calls an interface in the API 130 to open an archive associated with the archiving system 124 to archive information stored in the transactional database 106. As another example, determining that the first application is an archiving application can include detecting a particular database connection. For example, the database abstraction layer 108 can receive a database command from the process 134 which includes a connection qualifier which indicates that the process 134 is executing an archiving application (e.g., the archiving application 126).

In step 406, an archiving mode is assigned to the first process, based on the determination. For example, with respect to FIG. 2, the process layer 222 assigns the archiving mode to a process which is executing the archiving application 202. In some implementations, if the first process creates one or more child processes, each of the child processes can inherit the archiving mode.

In step 408, a request to delete information is received from the first process after assigning the archiving mode. For example, with respect to FIG. 2, as indicated by the time points 238, 240, and 242 on the timeline 248, the process layer 222 receives requests to delete information (e.g., corresponding to the delete command 214) from the process executing the archiving application 202.

In step 410, the request to delete information is processed according to the archiving mode. For example, in some implementations, the transactional system is configured to perform an archiving process before a replication process and processing the request to delete information includes converting the request to delete information to a new request that includes a copy request for the information and a delete request for the information, creating an information copy from the information according to the copy request, and deleting the information according to the delete request. For example, the process layer 222 converts requests to delete information received from the process executing the archiving application 202 based on the process being in the archiving mode. The process layer 222 converts the request to delete information associated with the time point 238 to a new request that includes a copy request and a delete request, as illustrated by the time points 282 and 284, respectively.

As other examples, the database abstraction layer 280 or a native database layer (e.g., the native database layer 112) can convert the request to delete information to the new request and can perform the copy request and the delete request. Performing the copy request can result in the information copy being provided to an analysis system (e.g., the analysis system 114 of FIG. 1). In some implementations, the copy request triggers a replication system (e.g., the replication system 116) to provide the information copy to the analysis system. Performing the delete request can result in information being deleted from the transactional system (e.g., from the transactional database 106). The copy request can be performed before the delete request is committed.

After receiving the information copy, an analysis application included in the analysis system can use the information copy for analysis. For example, with respect to FIG. 1, the analysis application(s) 118 included in the analysis system 114 can use the information copy. In some implementations, the information copy is provided to the transactional system rather than to the analysis system, and may be stored, for example, in a persistent buffer of the transactional database 106. A replication system (e.g., the replication system 116) can subsequently and asynchronously provide the information copy to the analysis system.

In some implementations, a second application is executed in a second process, where the second process has a non-archiving mode assigned. Another request to delete other information can be received, from the second process, before completion of the first process and after determining that the first process is an archiving application. The other request to delete the other information can be processed without converting the other request to the new request. In other words, in some implementations, in response to a request to delete information received from a process that is in a non-archiving mode, the request to delete information is not converted, and the request to delete information is therefore performed (e.g., resulting in deletion of information from the transactional system). For example, with respect to FIG. 2, the process layer 222 does not convert requests to delete information received from a process executing the transactional application 204 (e.g., a request corresponding to the time point 272), since that process is not in the archiving mode.

Figure 5:
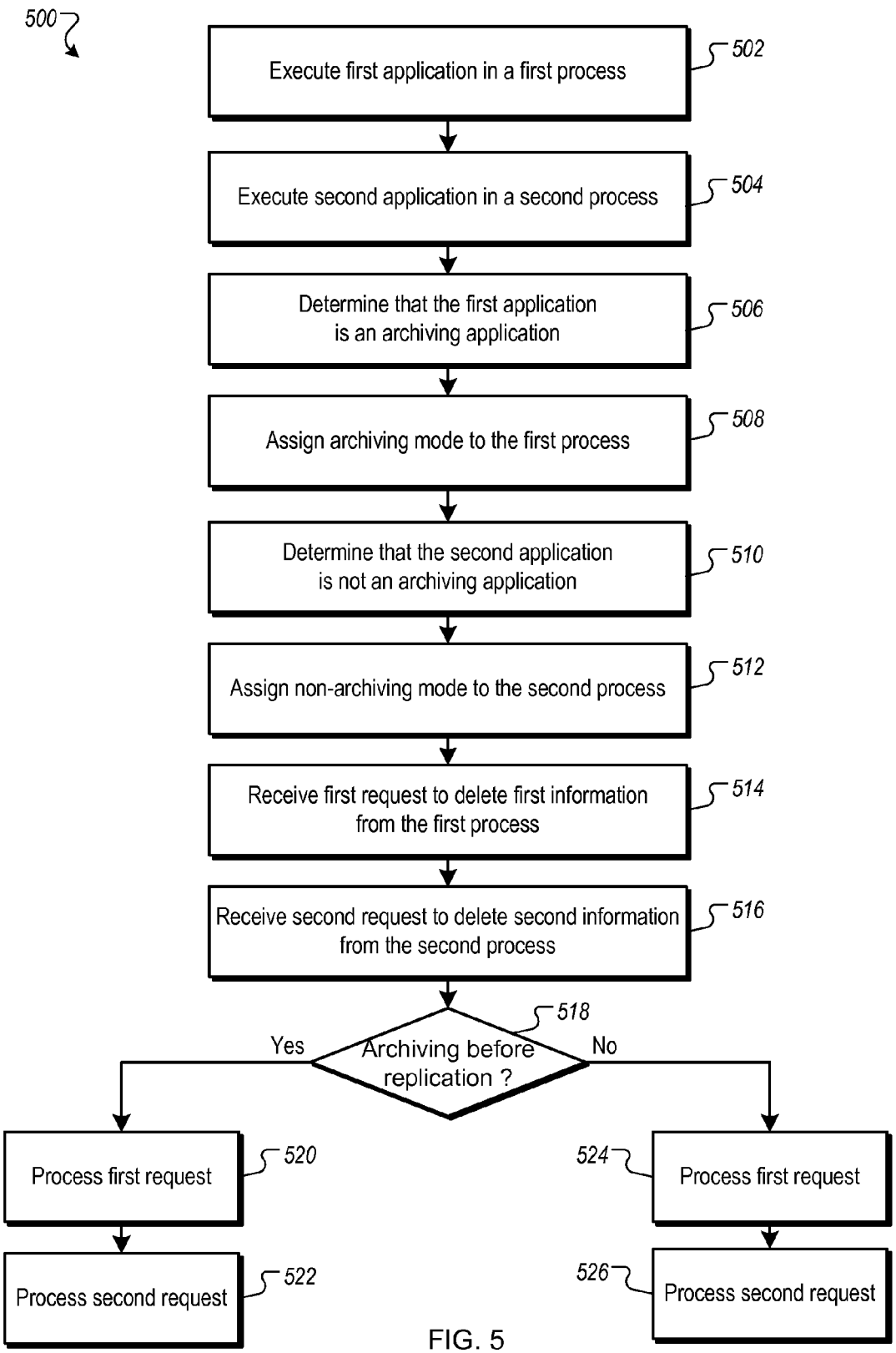

In some implementations, the transactional system is configured to perform an archiving process after a replication process and processing a request to delete information received from a process that is in the non-archiving mode includes identifying information included in an analysis system which corresponds to the information specified in the delete request and deleting the identified information from the analysis system. For example, with respect to FIG. 3, the time point 382 corresponds to the delete command 356 that is associated with the transactional application 304. An associated time point 384 corresponds to a request to delete information from an analysis system that corresponds to the information that is requested to be deleted by the command 356. In implementations where the transactional system is configured to perform an archiving process after a replication process, processing a request to delete information received from a process in an archiving mode includes deleting information from the transactional system without deleting corresponding information from the analysis system FIG. 5 shows a flow chart of an example of a method 500 that can be used for archiving information. The method 500 can be performed by a processor executing instructions in a computer program product. The method 500 illustrates how requests to delete information can be handled differently depending on whether archiving is involved.

In step 502, a first application is executed in a first process of a computer system. For example, with respect to FIG. 1, the archiving application 126 may be executed in the process 134. In step 504, a second application is executed in a second process of the computer system. For example, with respect to FIG. 1, the transactional application 104 may be executed by a process (not shown in FIG. 1) in the process layer 132.

In step 506, it is determined that the first application is an archiving application configured to archive information stored in a transactional component of the computer system. For example, with respect to FIG. 1, the process layer 132 may determine that the archiving application 126 is an archiving application configured to archive information stored in the transactional database 106. In step 508, an archiving mode is assigned to the first process, based on the determination that the first application is an archiving application. For example, with respect to FIG. 1, the process layer 132 can assign an archiving mode to the process 134, based on the determination that the archiving application 126 is an archiving application.

In step 510, it is determined that the second application is not an archiving application. For example, with respect to FIG. 1, the process layer 132 may determine that the transactional application 104 is not an archiving application. In step 512, a non-archiving mode is assigned to the second process, based on the determination that the second application is not an archiving application. For example, with respect to FIG. 1, the process layer 132 can assign a non-archiving mode to the process that is executing the transactional application 104, based on the determination that the transactional application 104 is not an archiving application.

In step 514, a first request to delete first information is received from the first process. For example, with respect to FIG. 2, as indicated by the time points 238, 240, and 242 on the timeline 248, the process layer 222 receives requests to delete information (e.g., corresponding to the delete command 214) from the process executing the archiving application 202. As another example, with respect to FIG. 3, as indicated by the time points 338, 340, and 342 on the timeline 348, the process layer 322 receives requests to delete information (e.g., corresponding to the delete command 324) from the process executing the archiving application 302.

In step 516, a second request to delete second information is received from the second process. For example, with respect to FIG. 2, as indicated by the time point 272 on the timeline 250, the process layer 222 receives a request to delete information (e.g., corresponding to the delete command 256) from the process executing the transactional application 202. As another example, with respect to FIG. 3, as indicated by the time point 372 on the timeline 350, the process layer 322 receives a request to delete information (e.g., corresponding to the delete command 356) from the process executing the transactional application 302.

In step 518, it is determined whether the computer system is configured to perform an archiving process before a replication process. For example, with respect to FIG. 1, the process layer 132 (or another component) can read a configuration setting, such as from a file, a database, or some other storage area, or can send an inquiry message to another system or component (e.g., the replication system 116, the archiving system 124) and can receive a response that indicates whether the system 100 is configured to perform an archiving process before a replication process.

If it is determined that the computer system is configured to perform the archiving process before the replication process, in step 520, the first request to delete the first information is processed including 1) converting the request to delete the first information to a new request that includes a copy request for the first information and a delete request for the first information; 2) creating an information copy from the first information according to the copy request; and 3) deleting the first information according to the delete request. For example, with respect to FIG. 2, the process layer 222 converts requests to delete information received from the process executing the archiving application 202 based on the process being in the archiving mode. For example, the process layer 222 converts the request to delete information associated with the time point 238 to a new request that includes a copy request and a delete request, as illustrated by the time points 282 and 284, respectively.

In step 522, the second request to delete the second information is processed including deleting the second information from the transactional component. For example, with respect to FIG. 1, processing a request to delete information that is received from the transactional application 104 can include deleting information from the transactional database 106.

If it is determined (e.g., in step 520) that the computer system is configured to perform the archiving process after the replication process, in step 522, the first request to delete the first information is processed including deleting the first information from the transactional component without deleting corresponding information from an analysis system. For example, with respect to FIG. 3, time points 388, 389, and 390 on a timeline 391 can represent three executions, in the database abstraction layer 380, of the delete command 314 associated with the archiving application 302, after the process layer 322 submits the delete command 314, unconverted, to the database abstraction layer 380 (e.g., the delete command 314 can delete information from the transactional component, but does not delete information from the analysis system). As another example, indicators 392, 393, and 394 can represent the process layer 322 blocking or inhibiting requests to delete information from the analysis system that correspond to the requests to delete information that are associated with the time points 338, 340, and 342, respectively (e.g., where the time points 338, 340, and 342 are associated with the delete command 314 that is requested by the process that is associated with the archiving application 302 and that is in the archiving mode).

In step 524, the second request to delete the second information is processed including 1) identifying information in the analysis system that corresponds to the second information; 2) deleting the identified information from the analysis system; and 3) deleting the second information from the transactional component. For example, with respect to FIG. 3, in place of the request to delete information represented by the delete command 356, a first delete request and a second delete request can be submitted to a database abstraction layer 380, where the first delete request is a request to delete information from the transactional system and the second delete request is a request to delete corresponding information from the analysis system. For example, for the execution of the delete command 356, the process layer 322 can convert the delete command 356 to a first delete command and a second delete command, represented by time points 382 and 384 on a timeline 386, respectively. The timeline 386 represents execution of database commands by the database abstraction layer 380 for the process associated with the transactional application 304.

Figure 6:
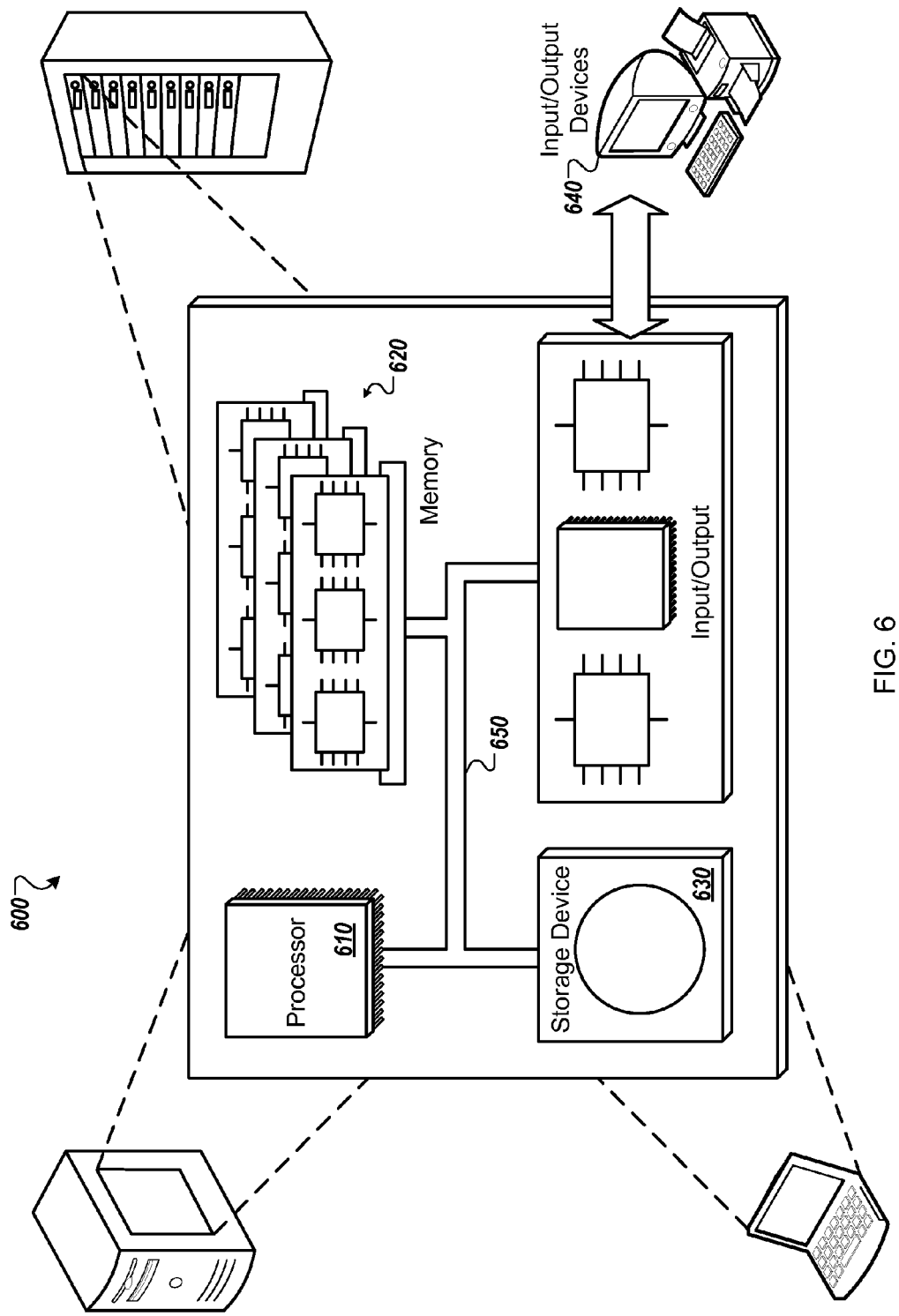
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. The memory 620 is a volatile memory unit in some implementations and is a non-volatile memory unit in other implementations.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for archiving information, the method comprising:
    executing a first application in a first process;
    determining that the first application is a non-archiving application;
    receiving, from the first process, a first request to delete first information that is stored in a transactional system, wherein information that is stored in the transactional system is periodically copied by a replication system to an analysis system;
    performing, based on having determined that the first application is a non-archiving application, the first request to delete the first information without converting the first request into separate copy and delete requests;
    executing a second application in a second process;
    determining that the second application is an archiving application configured to archive information that is stored in the transactional system;
    receiving, from the second process, a second request to delete second information that is stored in the transactional system;
    converting, based on having determined that the second application is an archiving application, the second request to delete the second information that is stored in the transactional system to a new request that comprises: (i) a copy request to copy the second information from the transactional system to an analysis system, and (ii) a delete request to delete the second information that is stored in the transactional system;
    copying, according to the copy request to copy the second information from the transactional system to the analysis system, the second information from the transactional system to the analysis system; and
    deleting, according to the delete request to delete the second information that is stored in the transactional system, the second information that is stored in the transactional system.

2. The computer-implemented method of claim 1, wherein determining that the second application is an archiving application comprises detecting a call to open an archive.

3. The computer-implemented method of claim 1, wherein determining that the second application is an archiving application comprises detecting a particular database connection.

4. The computer-implemented method of claim 1, wherein copying the second information from the transactional system to the analysis system includes copying the second information to the transactional system and the replication system subsequently providing the second information to the analysis system.

5. The computer-implemented method of claim 1, further comprising using, by an analysis application, the second information that has been copied to the analysis system.

6. The computer-implemented method of claim 1, wherein the new request comprises a delete-into request which comprises, in one database command, the copy request and the delete request.

7. The computer-implemented method of claim 1, wherein processing the second request to delete the second information comprises deleting information from the transactional system and not deleting information from the analysis system.

8. The computer-implemented method of claim 7,
    wherein performing the first request to delete the first information includes, in addition to deleting the first information that is stored in the transactional system, 1) identifying information in the analysis system that corresponds to the first information; and 2) deleting the identified information from the analysis system.

9. A computer-implemented method for archiving information, the method comprising:
    executing a first application in a first process of a computer system;
    executing a second application in a second process of the computer system;
    determining that the first application is an archiving application configured to archive information that is stored in a transactional system of the computer system;
    determining that the second application is not an archiving application;
    receiving, from the first process, a first request to delete first information that is stored in the transactional system;
    receiving, from the second process, a second request to delete second information that is stored in the transactional system;
    determining whether the computer system is configured to perform an archiving process before a replication process;
    in response to determining that the computer system is configured to perform the archiving process before the replication process:
        converting, based on having determined that the first application is an archiving application, the first request to delete the first information that is stored in the transactional system to a new request that comprises: (i) a copy request to copy the first information from the transactional system to an analysis system, and (ii) a delete request to delete the first information that is stored in the transactional system;

copying, according to the copy request to copy the first information from the transactional system to the analysis system, the first information from the transactional system to the analysis system;

deleting, according to the delete request to delete the first information that is stored in the transactional system, the second information that is stored in the transactional system; and deleting, according to the delete request to delete the second information that is stored in the transactional system, the second information that is stored in the transactional system;

in response to determining that the computer system is configured to perform the archiving process after the replication process:

deleting, based on having determined that the first application is an archiving application, the first information from the transactional system without deleting corresponding information from an analysis system;

identifying, based on having determined that the second application is not an archiving application, information in the analysis system that corresponds to the second information;

deleting, based on having determined that the second application is not an archiving application, the identified information from the analysis system; and deleting, based on having determined that the second application is not an archiving application, the second information from the transactional system.

10. The computer-implemented method of claim 9, wherein determining that the first application is an archiving application comprises detecting a call to open an archive.

11. The computer-implemented method of claim 9, wherein determining that the first application is an archiving application comprises detecting a particular database connection.

12. A computer program product embodied in a non-transitory computer readable storage device and comprising instructions that when executed by a processor perform a method comprising:

executing a first application in a first process;

determining that the first application is a non-archiving application;

receiving, from the first process, a first request to delete first information that is stored in a transactional system, wherein information that is stored in the transactional system is periodically copied by a replication system to an analysis system;

performing, based on having determined that the first application is a non-archiving application, the first request to delete the first information without converting the first request into separate copy and delete requests;

executing a second application in a second process;

determining that the second application is an archiving application configured to archive information that is stored in the transactional system;

receiving, from the second process, a second request to delete second information that is stored in the transactional system;

converting, based on having determined that the second application is an archiving application, the second request to delete the second information that is stored in the transactional system to a new request that comprises: (i) a copy request to copy the second information from the transactional system to an analysis system, and (ii) a delete request to delete the second information that is stored in the transactional system;

copying, according to the copy request to copy the second information from the transactional system to the analysis system, the second information from the transactional system to the analysis system; and deleting, according to the delete request to delete the second information that is stored in the transactional system, the second information that is stored in the transactional system.

13. A system comprising:

at least one processor; and a computer program product embodied in a non-transitory computer readable storage device and comprising instructions that when executed by the processor cause the system to perform a method comprising:

executing a first application in a first process;

determining, by the at least one processor, that the first application is a non-archiving application;

receiving, from the first process, a first request to delete first information that is stored in a transactional system, wherein information that is stored in the transactional system is periodically copied by a replication system to an analysis system;

performing, based on having determined that the first application is a non-archiving application, the first request to delete the first information without converting the first request into separate copy and delete requests;

executing a second application in a second process;

determining, by the at least one processor, that the second application is an archiving application configured to archive information that is stored in the transactional system;

receiving, from the second process, a second request to delete second information that is stored in the transactional system;

converting, based on having determined that the second application is an archiving application, the second request to delete the second information that is stored in the transactional system to a new request that comprises: (i) a copy request to copy the second information from the transactional system to an analysis system, and (ii) a delete request to delete the second information that is stored in the transactional system;

copying, according to the copy request to copy the second information from the transactional system to the analysis system, the second information from the transactional system to the analysis system; and deleting, according to the delete request to delete the second information that is stored in the transactional system, the second information that is stored in the transactional system.

* * * * *